US012388831B2

(12) United States Patent
Nagar et al.

(10) Patent No.: US 12,388,831 B2
(45) Date of Patent: Aug. 12, 2025

(54) ROLE ASSIGNMENT FOR INTELLIGENT VIRTUAL ASSISTANTS

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Radha Srinivasan, Bangalore (IN); Sidharth Ullal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 17/933,135

(22) Filed: Sep. 19, 2022

(65) Prior Publication Data

US 2024/0098094 A1    Mar. 21, 2024

(51) Int. Cl.
*H04L 9/40*    (2022.01)
*G06F 9/451*    (2018.01)

(52) U.S. Cl.
CPC ............ *H04L 63/105* (2013.01); *G06F 9/453* (2018.02)

(58) Field of Classification Search
None
See application file for complete search history.

(56) References Cited

U.S. PATENT DOCUMENTS

| 9,098,467 | B1 | 8/2015 | Blanksteen |
| 9,826,083 | B2 | 11/2017 | Kanevsky |
| 10,304,463 | B2 | 5/2019 | Mixter |
| 10,354,653 | B1 | 7/2019 | Vijayvergia |
| 10,650,829 | B2 | 5/2020 | Kline |
| 10,957,083 | B2 | 3/2021 | Du |

(Continued)

FOREIGN PATENT DOCUMENTS

| JP | 2020525901 A | 8/2020 |
| JP | 2020525903 A | 8/2020 |
| JP | 2021508848 A | 3/2021 |

OTHER PUBLICATIONS

Disclosed Anonymously, "AI based Collective Voice Control Collaboration among Audio Conference Participants", https://priorart.ip.com/IPCOM/000252776, Feb. 8, 2018, pp. 1-4.

(Continued)

*Primary Examiner* — Philip J Chea
*Assistant Examiner* — James Ross Hollister
(74) *Attorney, Agent, or Firm* — Tihon Poltavets

(57) ABSTRACT

A method includes identifying a cluster of users with a plurality of devices, where each user from the cluster of users is associated with at least one device from the plurality of devices. The method also includes identifying an authorized user from the cluster of users to delegate role assignments to a remaining portion of the cluster of users and receiving, from the authorized user, a first role assignment for a first user from the remaining portion of the cluster of users. In response to receiving, from the first user, an audio command, the method also includes determining whether the first user is authorized to provide the audio command to the intelligent virtual assistant based on the first role assignment. In response to determining the first user is authorized to provide the audio command, the method also includes performing the audio command from the first user.

18 Claims, 3 Drawing Sheets

(56) References Cited

U.S. PATENT DOCUMENTS

| | | | |
|---|---|---|---|
| 2008/0255852 A1 | 10/2008 | Hu | |
| 2012/0265528 A1* | 10/2012 | Gruber | G10L 15/183 |
| | | | 704/235 |
| 2018/0332169 A1* | 11/2018 | Somech | H04L 67/55 |
| 2019/0213528 A1* | 7/2019 | Gupta | G06Q 10/10 |
| 2019/0349385 A1* | 11/2019 | Fox | H04L 63/20 |
| 2021/0074068 A1 | 3/2021 | Spivack | |
| 2021/0349753 A1* | 11/2021 | Ou | G06F 9/4856 |
| 2022/0358448 A1* | 11/2022 | Beringer | G06Q 10/063118 |
| 2022/0374612 A1* | 11/2022 | Badr | G10L 15/26 |

OTHER PUBLICATIONS

IBM, "AR and VR in the workplace", https://www.ibm.com/thought-leadership/institute-business-value/report . . . , accessed Sep. 19, 2022, pp. 1-6.

\* cited by examiner

ROLE ASSIGNMENT FOR INTELLIGENT VIRTUAL ASSISTANTS

BACKGROUND

This disclosure relates generally to intelligent virtual assistants (IVAs), and in particular to role assignment for users of IVAs.

An intelligent virtual assistant represents a software instrument capable of performing various tasks for a user based on commands or question provided by the user. The IVA is often incorporated into an Internet of Things (IoT) device connected to a communications network, where the user provides the commands or questions in audible or textual form. In a multi-user environment, the IVA can receive commands or questions from each of the multiple users when activated, where the received commands or questions can conflict with one another. Certain IVAs are specifically programmed to listen to a distinct voice of an authorized user, such that the IVA only listens for the distinct voice of the authorized user.

SUMMARY

Embodiments in accordance with the present invention disclose a method, computer program product and computer system for role assignment for intelligent virtual assistants, the method, computer program product and computer system can identify a cluster of users with a plurality of devices, wherein each user from the cluster of users is associated with at least one device from the plurality of devices. The method, computer program product and computer system can identify an authorized user from the cluster of users to delegate role assignments to a remaining portion of the cluster of users. The method, computer program product and computer system can, responsive to pairing each of the plurality of device to an intelligent virtual assistant associated with the authorized user, receive, from the authorized user, a first role assignment for a first user from the remaining portion of the cluster of users. The method, computer program product and computer system can delegate the first role assignment to the first user, wherein the first role assignment is associated with providing a command to the intelligent virtual assistant. The method, computer program product and computer system can, responsive to receiving, from the first user, an audio command, determine whether the first user is authorized to provide the audio command to the intelligent virtual assistant based on the first role assignment. The method, computer program product and computer system can, responsive to determining the first user is authorized to provide the audio command based on the first role assignment, perform, by the intelligent virtual assistant, the audio command from the first user.

DETAILED DESCRIPTION

Figure 1:
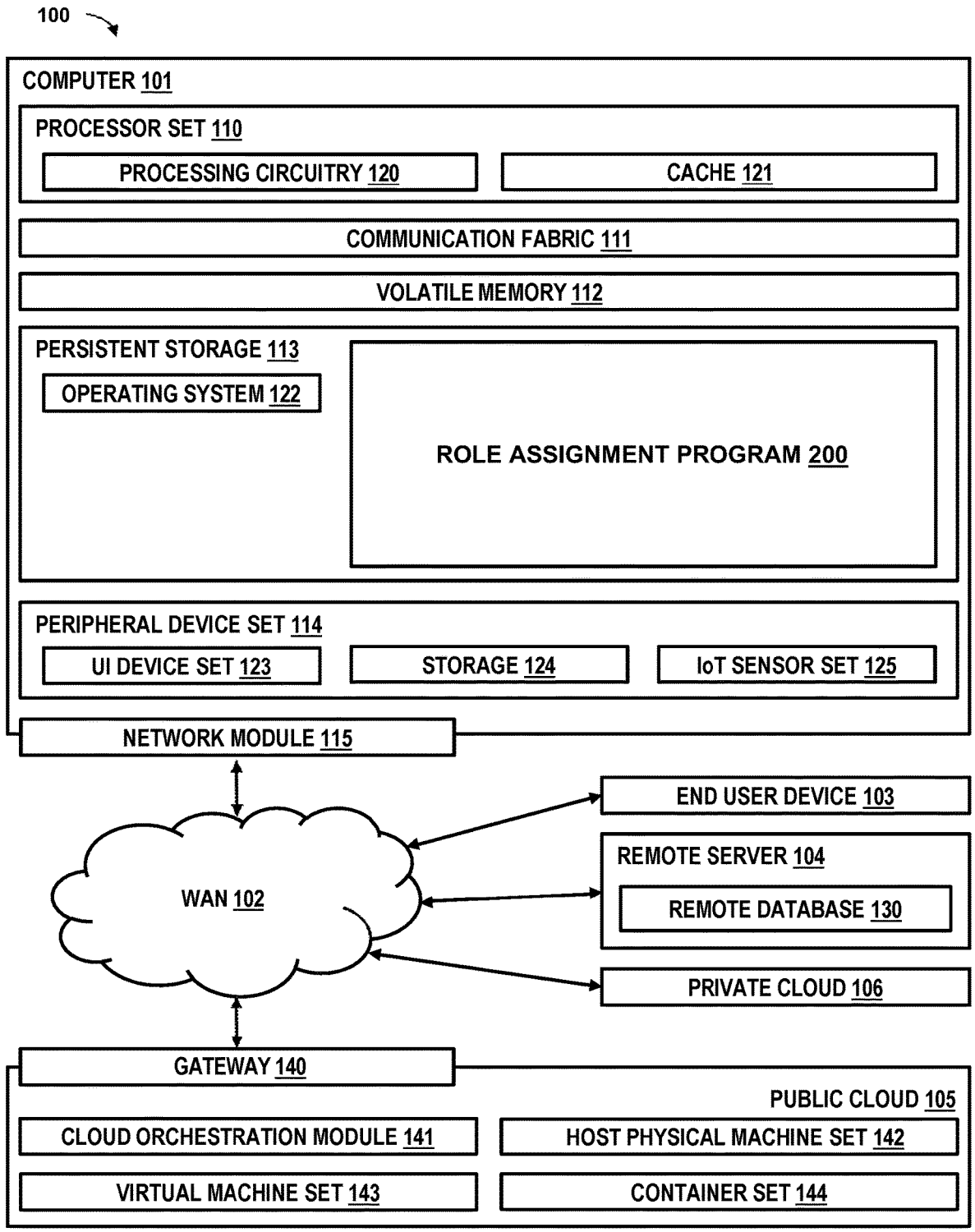
FIG. 1 is a functional block diagram illustrating a computing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention utilize wearable devices to allow an authorized user of an intelligent virtual assistant (IVA) to selectively delegate role and topic based permissions for voice command submissions in a multi-user environment. For example, user A invites user B, C, D, E, and F to a business meeting and initially meet in a conference room, wherein the conference room includes an IVA device. During a discussion, user A utilizing an associated augmented reality (AR) headset, delegates a first role assignment to user B to submit voice commands relating to placing an order for a rideshare and a second role to user D to submit voice commands relating to lunch reservations for the business meeting. While delegating or assigning permissions to submit voice request in a selective manner, embodiments of the present invention allow for a user to define a time range and/or a specified event until when the selected users can submit voice commands to the IVA device. For example, while delegating voice command submission role to other user, the user can define a time range (e.g., x<30 min) or an event, (e.g., wearable device associated with the user is no longer paired with the IVA device). After the defined time range or in response to the event occurring, embodiments of the present invention instruct the IVA device to ignore the audio commands.

Utilizing the wearable device, the authorized user can gesture (e.g., arm, finger) to selectively identify a user in the surrounding who can submit different voice commands, where embodiments of the present invention instruct the IVA device what user can submit a voice command and before executing the voice command, identify the delegated role. When any voice command is submitted, embodiments of the present invention recognize the delegate person based on voice recognition and perform contextual analysis of the voice command to identify if the voice command should be executed or if the voice command should be ignored. During interactions between users and the IVA device, the authorized user can delegate the current conversation to other users on real-time basis and embodiments of the present invention can dynamically switch to another user who can perform conversation. Subsequent to performing the delegation of voice command submissions, the authorized user delegating the roles person can utilize an associated wearable device to reject/further delegate the voice command submission role to other users and notify the other users. The authorized user can delegate the voice command submission role to multiple users for any specific topic and the multiple users can submit voice commands on a similar topic.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as role assignment program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
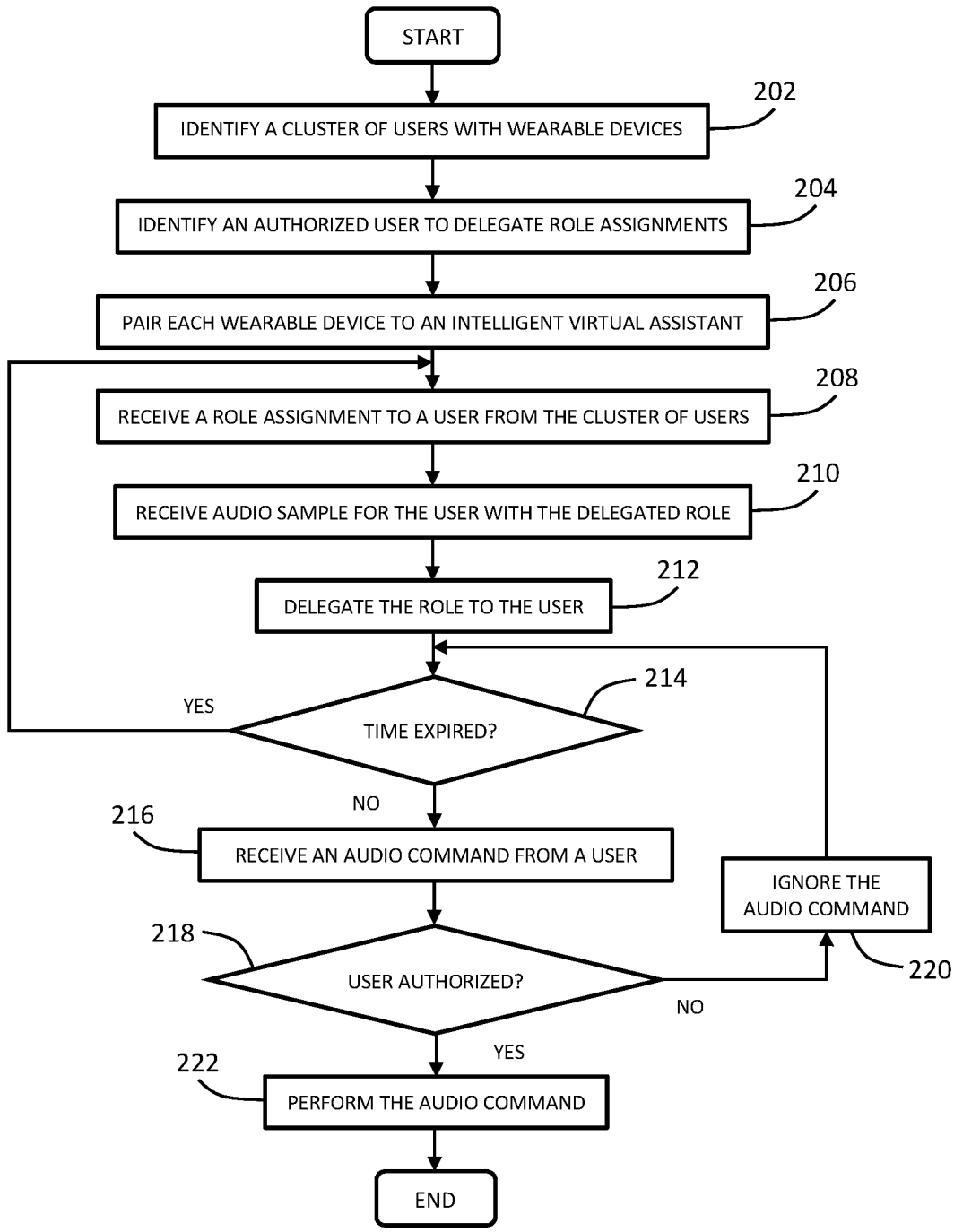
FIG. 2 depicts a flowchart of a role assignment program for delegating roles to another user to perform actions with an intelligent virtual assistant, in accordance with an embodiment of the present invention.

FIG. 2 depicts a flowchart of a role assignment program for delegating roles to another user to perform actions with an intelligent virtual assistant, in accordance with an embodiment of the present invention.

Role assignment program 200 identifies a cluster of users with wearable devices (202). Examples of a wearable device through which role assignment program 200 identifies a user can include, but is not limited to, a smart watch, an augmented reality (AR) headset, and wireless headphones, where the wearable device can operate independently and/or as a secondary device that is paired to a primary device (e.g., smartphone). In one embodiment, role assignment program 200 identifies a cluster of users with wearable devices utilizing a shared local network, where each wearable device is associated with a user from the cluster of users. For example, individual A, B, and C are visiting a private residence associated with individual D, where each wearable device associated with the individual A, B, C, and D is connected to a local Wi-Fi™ network at the private residence. In another embodiment, role assignment program 200 identifies a cluster of users with wearable devices based on distances between each user and other users from the cluster of users. For example, individual A, B, C, D, and E are attending a professional conference and gather in a lobby of a hotel, where role assignment program 200 identifies each individual from the cluster of individuals located within a set distance (e.g., 10 feet) as defined by a type of close-range wireless communication. Role assignment program 200 identifies individual A as being positioned within the set distance with respect to individual B, C, D, and E, individual B as being positioned within the set distance with respect to individual C, D, and E, individual C as being positioned within the set distance with respect to individual D, and E, and individual D as being positioned within the set distance with respect to individual E.

Role assignment program 200 identifies an authorized user to delegate role assignments (204). In one embodiment, role assignment program 200 identifies an authorized user to delegate role assignments by receiving a user selection of another user in the cluster of users. For example, individual A, B, and C are visiting a private residence associated with individual D, where individual B utilizes an associated wearable device to select individual D. Role assignment program 200 identifies the authorized user as individual B based on individual B utilizing the associated wearable device to select individual D. In another embodiment, role assignment program 200 provides a user interface selectable option in $3rd$ party applications (e.g., food delivery, ride share) to delegate role assignments in the $3rd$ party applications. For example, individual A, B, C, D, and E are attending a professional conference and gather in a lobby of a hotel, where individual A opens a rideshare application for ordering a rideshare vehicle and a restaurant application for reserving a table at a restaurant. Role assignment program 200 provides a user interface selectable option in both, the rideshare application and the restaurant application, to delegate role assignment. Subsequent to role assignment program 200 receiving the selection by individual A in the rideshare application and/or the restaurant application, Role assignment program 200 identifies individual A as the authorized user to delegate the role assignments. It is to be noted that user authentication of individual A is performed by the wearable device or the $3rd$ party application, prior to role assignment program 200 identifying the authorized user to delegate role assignments.

In yet another embodiment, role assignment program 200 receives a verbal cue from a user out of the identified cluster of users with the wearable devices, where the verbal cue is customizable by based on user preferences. In one example, individual A, B, C, D, and E are attending a professional conference and gather in a lobby of a hotel, where individual A verbally states, "John, can you please order us a car utilizing rideshare co. You can use my account". Role assignment program 200, via the wearable device associated with individual A, captures the verbal statement, and extracts the words "John", "order", "rideshare co.", and "my account". Based on the extracted words, role assignment program 200 determines whether individual A has an account with rideshare co. In response to determining that role assignment program 200 does have an account with rideshare co., role assignment program 200 identifies individual A as the authorized user to delegate role assignments. In yet another embodiment, role assignment program 200 identifies an authorized user for delegating role assignments based on which wearable device is paired with an intelligent virtual assistance (IVA) for receiving verbal commands.

Role assignment program 200 pairs each wearable device to an intelligent virtual assistant (206). Based on the authorized user that role assignment program 200 identifies to delegate role assignments, role assignment program 200 pairs each wearable device associated with the remaining users from the cluster of users to an IVA associated with the authorized user. The IVA associated with the authorized user can operate on the wearable device associated with the authorized user and/or another electronic device (e.g., smartphone) with which the wearable device is paired. In one example, individual A, B, and C are visiting a private residence associated with individual D, where role assignment program 200 identifies individual B as the authorized user. Role assignment program 200 pairs the wearable devices associated with individual A, C, and D to an IVA operating on a wearable device associated with individual B. In another example, individual A, B, and C are visiting a private residence associated with individual D, where role assignment program 200 identifies individual D as the authorized user based on the local residence being owned by individual D. Role assignment program 200 pairs the wearable devices associated with individual A, B, and C to an IVA operating on the same local Wi-Fi™ network to which the wearable devices are connected. In yet another example, individual A, B, C, D, and E are attending a professional conference and gather in a lobby of a hotel, where role assignment program 200 identifies individual A as the authorized user. Role assignment program 200 pairs the wearable devices associated with individual B, C, D, and E to a smartphone associated with individual A with which the wearable device of individual A is paired to.

Role assignment program 200 receives a role assignment to a user from the cluster of users (208). In one embodiment, role assignment program 200 receives a role assignment for a user from the cluster of users as a verbal statement, where the role assignment is associated with performing a task. For example, individual A, B, C, D, and E are attending a professional conference and gather in a lobby of a hotel, where role assignment program 200 identified individual A as the authorized user from a previously received verbal statement. The previously received verbal statement includes, "John, can you please order us a car utilizing rideshare co. You can use my account". Based on the previously received verbal statement utilized by role assignment program 200 to identify individual A as the authorized user, role assignment program 200 identifies "John" as individual B based on a username set for an associated wearable device. Therefore, role assignment program 200 determines that individual B has a role assignment of ordering a car utilizing rideshare co. for which individual A has an account with. In another embodiment, role assignment program 200 receives a role assignment for a user from the cluster of user via the wearable device associated with the authorized user. In one example, the authorized user is wearing an AR headset that tracks eye movement and based on viewing direction of the authorized user and known locations for each of the wearable device associated with the cluster of users, role assignment program 200 identifies another user from the cluster of users for assigning a role. In another example, the authorized user is wearing an AR headset with a forward facing camera that captures a gesture by the authorized user that can include an arm and/or hand pointing in a direction of a user from the cluster of users. Utilizing known positions for the wearable devices associated with the cluster of users, role assignment program 200 identifies another user from the cluster of user for assigning a role.

In addition to receiving a role assignment to for a user from the cluster of users, role assignment program 200 can receive a time limit and/or a specified event limit for which the delegated role assignment is valid. In one example, individual A, B, C, D, and E are attending a professional conference and gather in a lobby of a hotel, where role assignment program 200 identified individual A as the authorized user from a previously received verbal statement. Role assignment program 200 receives a role assignment for individual B to order a car utilizing rideshare co., along with a previously provided user specified event limit from individual A for the role assignment. The user specified event limit indicates a number of times (e.g., once) individual B can order a car utilizing an account of individual A for rideshare co. In another example, individual A, B, and C are visiting a private residence associated with individual D, where role assignment program 200 identifies individual D as the authorized user based on the local residence being owned by individual D. Role assignment program 200 receives, from individual D, a role assignment for individual A to order food from restaurant ABC, along with an authorized user specified time limit (e.g., five hours). The time limit represents a period of time for which the user delegated a role assignment can utilize the IVA and/or an account associated with the authorized user to perform the role. In this example, individual D who is the authorized user provided an authorized user specified time limit of five hours, where individual A can place any number of orders utilizing the IVA within the five hour time limit of the role assignment.

Role assignment program 200 receives an audio sample for the user with the delegated role (210). In one embodiment, role assignment program 200 receives an audio sample for each user who was delegated a role assignment, where each user previously opted-in and previously provided an audio sample to role assignment program 200. In another embodiment, role assignment program 200 initializes a microphone on a wearable device associated with a user with a delegated role assignment and role assignment program 200 receives an audio sample for the user. Role assignment program 200 temporarily stores the audio sample for the user with the delegated role assignment based on a received time limit and/or specified event limit, as previously discussed with regards to (208). In one example, individual A, B, C, D, and E are attending a professional conference and gather in a lobby of a hotel, where role assignment program 200 previously identified individual A as the authorized user and received, from individual A, a role assignment for individual B to order a car utilizing rideshare co. Role assignment program 200 queries the wearable device associated with individual B for an audio sample for the individual. Role assignment program 200 receives the audio sample for individual B and utilizes the audio sample for individual B as a form of verification to allow individual B to provide an audio command to the IVA with respect to the delegated role assignment by individual A (i.e., ordering a car utilizing rideshare co.).

In another example, individual A, B, and C are visiting a private residence associated with individual D, where role assignment program 200 previously identifies individual D as the authorized user and received, from individual D, a role assignment for individual A to order food from restaurant ABC. Role assignment program 200 queries a directory for an audio sample associated with individual A based on a user profile for individual A associated with a wearable device. If an entry is present in the directory for the audio sample associated with individual A, role assignment program 200 receives the audio sample and utilizes the audio for individual A as a form of verification to allow individual A to provide an audio command to the IVA with respect to the delegated role assignment by individual D (i.e., ordering food from restaurant ABC). If an entry is not present in the directory for the audio sample associated with individual A, role assignment program 200 queries the wearable device associated with individual A for an audio sample for the individual. Role assignment program 200 receives the audio sample for individual and utilizes the audio sample for individual A as a form of verification to allow individual A to provide an audio command to the IVA with respect to the delegated role assignment by individual B (i.e., ordering food from restaurant ABC).

Role assignment program 200 delegates the role to the user (212). Role assignment program 200 delegates the role to the user based on the role assignment received from the authorized user for the user from the cluster of users, along with any time limit and/or specified event limit. In one example, individual A, B, C, D, and E are attending a professional conference and gather in a lobby of a hotel, where role assignment program 200 previously identified individual A as the authorized user and received, from individual A, a role assignment for individual B to order a car utilizing rideshare co. with an account associated with individual A. Role assignment program 200 delegates the role of ordering a car from rideshare co. utilizing an account associated with individual A with a specified event limit of a single order. As a result, role assignment program 200 can only accept and perform a single audio command from individual B with regards to ordering a car from rideshare co. utilizing an account associated with individual A. In another example, individual A, B, and C are visiting a private residence associated with individual D, where role assignment program 200 previously identifies individual D as the authorized user and received, from individual D, a role assignment for individual A to order food from restaurant ABC with an account associated with individual D. Role assignment program 200 delegates the role of ordering food from restaurant ABC utilizing an account associated with individual D with a time limit of five hours (e.g., expected duration of an event). As a result, role assignment program 200 can accept and perform audio commands from individual A with regards to ordering food from restaurant ABC utilizing an account associated with individual D for five hours starting from the original point of time of delegating the role to individual A. If individual D is hosting an event and role assignment program 200 delegates the role for ordering food to individual A, then individual A can place a single or multiple orders for the specified time limit of five hours.

Role assignment program 200 determines whether time condition has expired for performing a command (decision 214). In the event role assignment program 200 determines the time condition has not expired ("no" branch, decision 214), role assignment program 200 receives an audio command from the user (216). In the event role assignment program 200 determines the time condition has expired ("yes" branch, decision 214), role assignment program 200 removes the role assignment associated with the user and reverts to receiving new role assignments the cluster of users (208).

As previously discussed, role assignment program 200 can receive a specified time limit for the role delegation, where the specified time limit represents the time condition. From a previously discussed example, role assignment program 200 determines whether the specified time limit of five hours (i.e., the time condition) has expired for individual A to perform a command relating to ordering food from restaurant ABC utilizing an account associated with individual D. For instances where a specified time limit was not provided, role assignment program 200 can utilize a security time limit, where the security time limit represents a default time limit (e.g., 15 minutes) for removing a delegated role assignment. From a previously discussed example, role assignment program 200 receives a specified event limit (i.e., single order) for individual B to order a car utilizing rideshare co. with an account associated with individual A, but a specified time limit was not provided. Role assignment program 200 utilizes a security time limit of 15 minutes (i.e., time condition) to ensure that if the delegated role assignment to individual B did not result in the performing of an audio command, role assignment program 200 removes the role assignment to individual A. Thus, preventing individual B from ordering a car from rideshare co. utilizing the account associated with individual A, at a later time (e.g., one week).

Role assignment program 200 receives an audio command from a user (216). Role assignment program 200 receives an audio command from a user from the cluster of users, where the audio command is associated with an application and/or account associated with the authorized user. In one example, individual A, B, C, D, and E are attending a professional conference and gather in a lobby of a hotel, where role assignment program 200 previously identified individual A as the authorized user and received, from individual A, a role assignment for individual B to order a car utilizing rideshare co. Role assignment program 200 receives, via a wearable device on individual B paired to an IVA associated with the authorized user, an audio command requesting a large SUV from rideshare co. at corner of 123 Main St traveling to 456 Central St. In another example, individual A, B, and C are visiting a private residence associated with individual D, where role assignment program 200 identifies individual D as the authorized user based on the local residence being owned by individual D. Role assignment program 200 receives, from individual D, a role assignment for individual A to order food from restaurant ABC. Role assignment program 200 receives, via an IVA, an audio command requesting two meals from restaurant ABC for delivery to the address of the private residence of individual D. It is to be noted that in the above described embodiment and examples, role assignment program 200 receives an audio command (i.e., verbal command) from a user. However, in other embodiments, role assignment program 200 can receive a command or question via an audio and/or textual input from each wearable device associated with each user from the cluster of users.

Role assignment program 200 determines whether the user is authorized to provide the audio command (decision 218). In the event role assignment program 200 determines the user is not authorized to provide the audio command ("no" branch, decision 220), role assignment program 200 ignores the audio command (220) and reverts to determining whether time condition has expired for performing a command (decision 214). In the event role assignment program 200 determines the user is authorized to provide the audio command ("yes" branch, decision 218), role assignment program 200 performs the audio command (222).

From a previous example, individual A, B, C, D, and E are attending a professional conference and gather in a lobby of a hotel, where role assignment program 200 previously identified individual A as the authorized user and received, from individual A, a role assignment for individual B to order a car utilizing rideshare co. Role assignment program 200 receives, via a wearable device on individual B paired to an IVA associated with the authorized user, an audio command requesting a large SUV from rideshare co. at corner of 123 Main St traveling to 456 Central St. Role assignment program 200 determines whether the user is authorized to provide the audio command with respect to the delegated role assignment. Role assignment program 200 identifies a role assignment (i.e., order a car utilizing rideshare co.) based on the received audio command and analyzes an audio profile of the user to determine whether the audio profile of the user matches the audio sample for the user delegated the role (i.e., individual B). If role assignment program 200 determines the audio profile of the user providing the audio command matches the audio sample for individual B, role assignment program 200 determines individual B is a source for the audio command and determines to perform the command. If role assignment program 200 determines the audio profile of the user providing the audio command does not match the audio sample for individual B, role assignment program 200 determines individual B is not a source for the audio command and determines to ignore the command.

In another example, individual A, B, and C are visiting a private residence associated with individual D, where role assignment program 200 identifies individual D as the authorized user based on the local residence being owned by individual D. Role assignment program 200 receives, from individual D, a role assignment for individual A to order food from restaurant ABC. Role assignment program 200 receives, via an IVA, an audio command requesting two meals from restaurant ABC for delivery to the address of the private residence of individual D. Role assignment program 200 identifies a role assignment (i.e., order food from restaurant ABC) based on the received audio command and analyzes an audio profile of the user to determine whether the audio profile of the user matches the audio sample for the user delegated the role (i.e., individual A). If role assignment program 200 determines the audio profile of the user providing the audio command matches the audio sample for individual A, role assignment program 200 determines individual A is a source for the audio command and determines to perform the command. If role assignment program 200 determines the audio profile of the user providing the audio command does not match the audio sample for individual A, role assignment program 200 determines individual A is not a source for the audio command and determines to ignore the command.

Role assignment program 200 performs the audio command (222). Role assignment program 200 performs the audio command according to any additional parameters provided by the authorized user. From a previous example, individual A, B, C, D, and E are attending a professional conference and gather in a lobby of a hotel, where role assignment program 200 previously identified individual A as the authorized user and received, from individual A, a role assignment for individual B to order a car utilizing rideshare co. Role assignment program 200 receives, via a wearable device on individual B paired to an IVA associated with the authorized user, an audio command requesting a large SUV from rideshare co. at corner of 123 Main St traveling to 456 Central St. Role assignment program 200 determined individual B is authorized to provide the audio command with respect to the delegated role assignment and role assignment program 200 performs the audio command of ordering the large SUV at the corner of 123 Main St traveling to 456 Central St. through the rideshare co. application, while utilizing the account of individual A In another example, individual A, B, and C are visiting a private residence associated with individual D, where role assignment program 200 identifies individual D as the authorized user based on the local residence being owned by individual D. Role assignment program 200 receives, from individual D, a role assignment for individual A to order food from restaurant ABC. Role assignment program 200 receives, via an IVA, an audio command requesting two meals from restaurant ABC for delivery to the address of the private residence of individual D. Role assignment program 200 determined individual A is authorized to provide the audio command with respect to the delegated role assignment and role assignment program 200 performs the audio command of ordering the two meals from restaurant ABC for delivery to the address of the private residence of individual D through a food delivery application, while utilizing the account of individual D.

Figure 3:
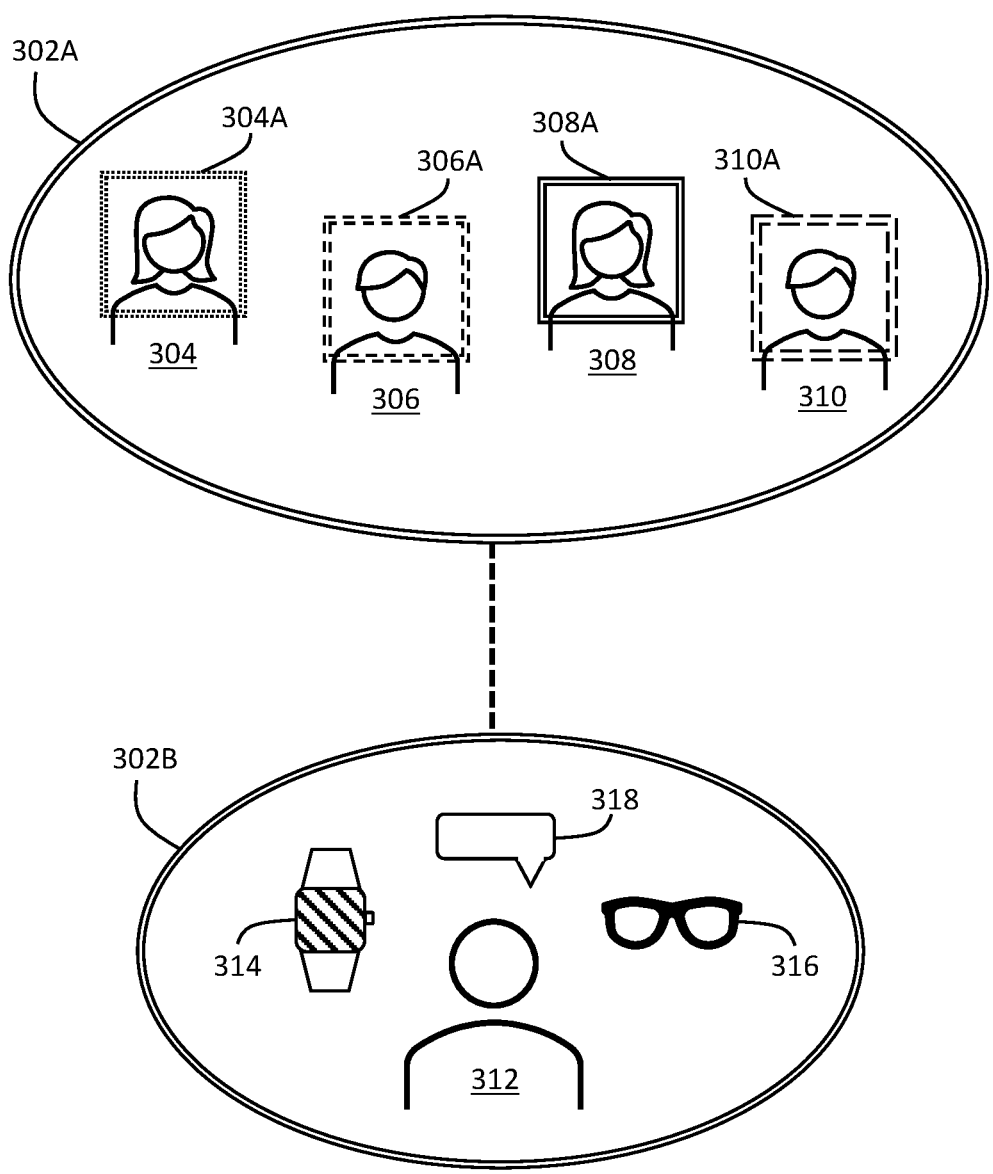
FIG. 3 depicts an illustrative example of an authorized user delegating roles to multiple users to perform actions with an intelligent virtual assistant, in accordance with an embodiment of the present invention.

FIG. 3 depicts an illustrative example of an authorized user delegating roles to multiple users to perform actions with an intelligent virtual assistant, in accordance with an embodiment of the present invention. In this example, role assignment program 200 identifies cluster of users 302A and 302B with various wearable devices, where role assignment program 200 identifies each user from cluster of users 302A and 302B based on an associated wearable device that was previously opted-in to participant in the role assignment. Cluster of users 302A and 302B include user 304, 306, 308, 310, and 312, where users 304 and 306 are each wearing a smart watch, users 308 and 310 are each wearing AR glasses, and user 312 is wearing smart watch 314 and AR glasses 316. Role assignment program 200 identifies an authorized user to delegate role assignments as user 312 and pairs each wearable device associated with each user (i.e., user 304, 306, 308, 310, and 312) to an intelligent virtual assistant associated with the authorized user, where the intelligent virtual assistant can receive a command or question via an audio and/or textual input from each wearable device associated with each user. Role assignment program 200 receives, via an input from user 312, a first role assignment to user 304, a second role assignment to user 306, a third role assignment to user 308, and a fourth role assignment to user 310. Role assignment program 200 can receive the input from user 312 in the form of a textual input, a physical input, and/or audio input 318 via smart watch 314 and/or AR glasses 316.

The textual input can include user 312 physically inputting a user's name or selecting a user via a user interface on smart watch 314 and/or AR glasses 316. As user 312 selects each user 304, 306, 308, 310, 312, role assignment program 200 can highlight each role assignment with a distinct frame 304A, 306A, 308A, and 310A, respectively. The physical input can include user 312 pointing an arm and finger to each user 304, 306, 308, 310, and 312, where the pointing of the arm and finger is capturable by smart watch 314 and/or AR glasses 316. An audio input can include user 312 audibly assigning a task to each user 304, 306, 308, 310, and 312, where the audible assignment is capturable by smart watch 314 and/or AR glasses 316. User 304 includes highlight 304A for the first role assignment, user 306 includes highlight 306A for the second role assignment, user 308 includes highlight 308A for the third role assignment, and user 310 includes highlight 310A for the fourth role assignment, where highlight 304A, 306A, 308A, and 310A are viewable by user 312 on smart watch 314 and/or AR glasses 316.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
identifying a cluster of users with a plurality of devices, wherein each user from the cluster of users is associated with at least one device from the plurality of devices;
identifying an authorized user from the cluster of users to delegate role assignments to a remaining portion of the cluster of users;
pairing each of the plurality of devices to an intelligent virtual assistant associated with the authorized user;
receiving, from the authorized user as a verbal statement, a first role assignment for a first user from the remaining portion of the cluster of users to perform a task in a first application utilizing an account associated with the authorized user, wherein the verbal statement includes authorization for the first user to utilize the account associated with the authorized user;
delegating the first role assignment to the first user, wherein the first role assignment is associated with providing a command to the intelligent virtual assistant;
receiving, via a first device associated with the first user from the plurality of devices, an audio command;
determining whether the first user is authorized to provide the audio command to the intelligent virtual assistant based on the first role assignment;
determining the first user is authorized to provide the audio command based on the first role assignment; and
performing, by the intelligent virtual assistant, the audio command from the first user.

2. The method of claim 1, wherein the first role assignment includes at least one of a specified time limit and a specified event limit for which the first role assignment is valid.

3. The method of claim 2, further comprising:
determining whether a time condition has expired for providing the command to the intelligent virtual assistant based on the first role assignment; and
responsive to determining the time condition has expired for providing the command to the intelligent virtual assistant based on the first role assignment, removing the first role assignment from the first user.

4. The method of claim 3, wherein the time condition is based at least on the specified time limit or the specified event limit.

5. The method of claim 1, wherein performing, by the intelligent virtual assistant, the audio command from the first user further comprises:
performing the task in the first application with the account associated with the authorized user.

6. The method of claim 1, wherein determining whether the first user is authorized to provide the audio command further comprises:
analyzing an audio sample for the first user associated with the first role assignment to determine whether an audio profile of the audio command matches the audio sample for the first user.

7. A computer program product comprising:
one or more computer readable storage media; and
program instructions stored on the one or more computer readable storage media to perform operations comprising:
identifying a cluster of users with a plurality of devices, wherein each user from the cluster of users is associated with at least one device from the plurality of devices;
identifying an authorized user from the cluster of users to delegate role assignments to a remaining portion of the cluster of users;
pairing each of the plurality of devices to an intelligent virtual assistant associated with the authorized user;
receiving, from the authorized user as a verbal statement, a first role assignment for a first user from the remaining portion of the cluster of users to perform a task in a first application utilizing an account associated with the authorized user, wherein the verbal statement includes authorization for the first user to utilize the account associated with the authorized user;
delegating the first role assignment to the first user, wherein the first role assignment is associated with providing a command to the intelligent virtual assistant;
receiving, via a first device associated with the first user from the plurality of devices, an audio command;
determining whether the first user is authorized to provide the audio command to the intelligent virtual assistant based on the first role assignment;
determining the first user is authorized to provide the audio command based on the first role assignment; and
performing, by the intelligent virtual assistant, the audio command from the first user.

8. The computer program product of claim 7, wherein the first role assignment includes at least one of a specified time limit and a specified event limit for which the first role assignment is valid.

9. The computer program product of claim 8, wherein the operations further comprise:
determining whether a time condition has expired for providing the command to the intelligent virtual assistant based on the first role assignment; and
responsive to determining the time condition has expired for providing the command to the intelligent virtual assistant based on the first role assignment, removing the first role assignment from the first user.

10. The computer program product of claim 9, wherein the time condition is based at least on the specified time limit or the specified event limit.

11. The computer program product of claim 7, wherein performing, by the intelligent virtual assistant, the audio command from the first user comprises:
performing the task in the first application with the account associated with the authorized user.

12. The computer program product of claim 7, wherein determining whether the first user is authorized to provide the audio command comprises:
analyzing an audio sample for the first user associated with the first role assignment to determine whether an audio profile of the audio command matches the audio sample for the first user.

13. A computer system comprising:
a processor set;
one or more computer readable storage media; and
program instructions stored on the one or more computer readable storage media to cause the processor set to perform operations comprising:
identifying a cluster of users with a plurality of devices, wherein each user from the cluster of users is associated with at least one device from the plurality of devices;

identifying an authorized user from the cluster of users to delegate role assignments to a remaining portion of the cluster of users;

pairing each of the plurality of devices to an intelligent virtual assistant associated with the authorized user;

receiving, from the authorized user as a verbal statement, a first role assignment for a first user from the remaining portion of the cluster of users to perform a task in a first application utilizing an account associated with the authorized user, wherein the verbal statement includes authorization for the first user to utilize the account associated with the authorized user;

delegating the first role assignment to the first user, wherein the first role assignment is associated with providing a command to the intelligent virtual assistant;

receiving, via a first device associated with the first user from the plurality of devices, an audio command;

determining whether the first user is authorized to provide the audio command to the intelligent virtual assistant based on the first role assignment;

determining the first user is authorized to provide the audio command based on the first role assignment; and performing, by the intelligent virtual assistant, the audio command from the first user.

14. The computer system of claim 13, wherein the first role assignment includes at least one of a specified time limit and a specified event limit for which the first role assignment is valid.

15. The computer system of claim 14, wherein the operations further comprise:

determining whether a time condition has expired for providing the command to the intelligent virtual assistant based on the first role assignment; and responsive to determining the time condition has expired for providing the command to the intelligent virtual assistant based on the first role assignment, removing the first role assignment from the first user.

16. The computer system of claim 15, wherein the time condition is based at least on the specified time limit or the specified event limit.

17. The computer system of claim 13, wherein performing, by the intelligent virtual assistant, the audio command from the first user comprises:

performing the task in the first application with the account associated with the authorized user.

18. The computer system of claim 13, wherein determining whether the first user is authorized to provide the audio command comprises:

analyzing an audio sample for the first user associated with the first role assignment to determine whether an audio profile of the audio command matches the audio sample for the first user.

* * * * *